Patented Jan. 28, 1930

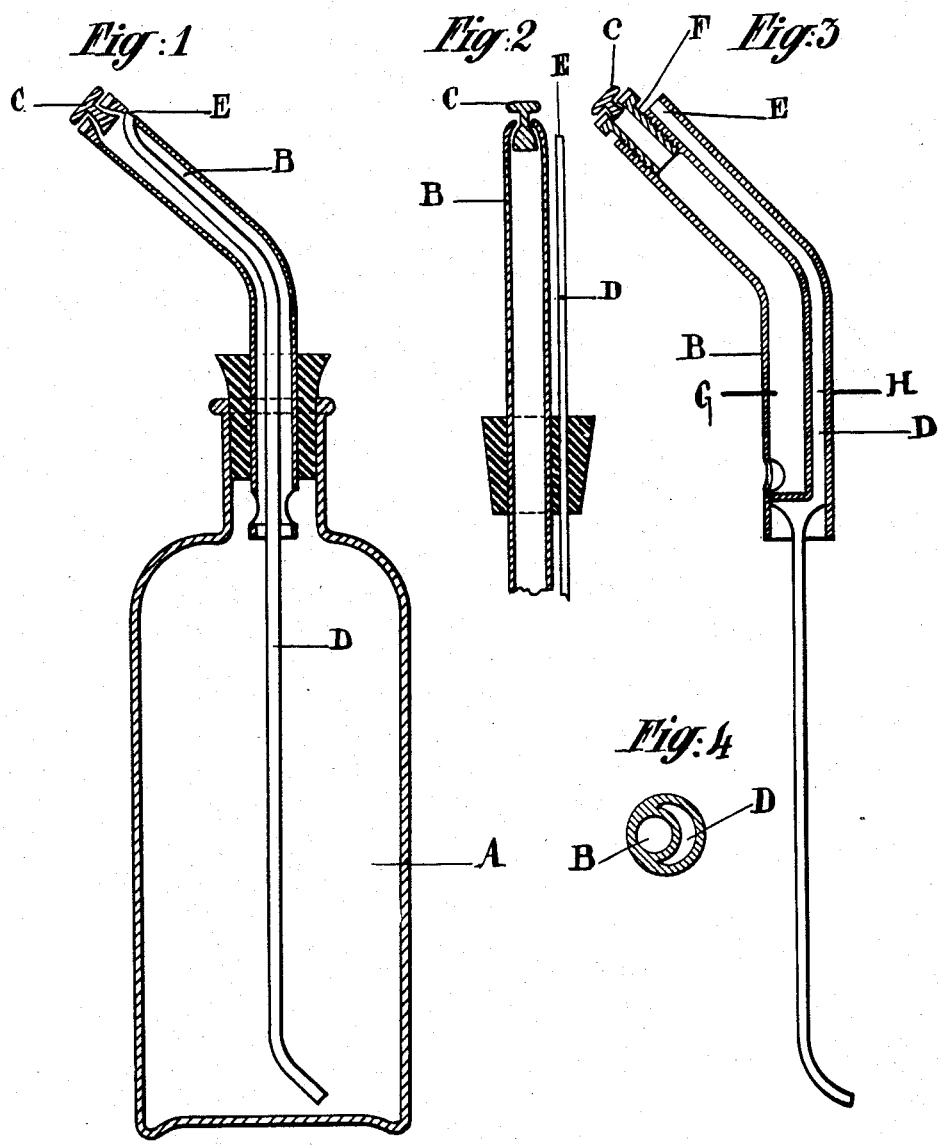

1,745,011

UNITED STATES PATENT OFFICE

JEAN LÉON MAURICE FRÉJACQUES, OF PARIS, FRANCE

AUTOMATIC DEVICE FOR STORAGE-BATTERY FILLING

Application filed December 31, 1927, Serial No. 243,956, and in France January 10, 1927.

It is an observed fact that in order to obviate the sulphating of storage battery plates, it is necessary to restore the proper level of the liquid by adding distilled water. However, such filling is often difficult to perform, especially if the storage batteries are situated in a place which is difficult of access, as is the case with a great number of motor vehicles.

The present invention relates to a device whereby storage batteries may be readily filled to the proper level. The said device consists essentially of a vessel A which is provided with two tubes, i. e. a tube for the discharge of water B, closed by a small clack valve C which will open when its end makes contact with the top of the battery plates, and an air inlet tube D, whose external orifice is situated at a suitable distance from the end of the said valve. The said tubes are inserted into the battery container which is to be supplied with water; the said valve opens when in contact with the plates, and the water flows out until its level attains the orifice of the air inlet tube, thus determining the exact level of the liquid.

The apparatus may be made of glass, celluloid, ebonite or like material which is unaffected by sulphuric acid. Since the end of the filling is indicated when the liquid rises in the air inlet tube, it is preferable to use a transparent material for the vessel and also for the part of the air inlet tube contained in the interior of the latter.

Figs. 1, 2 and 3 show by way of example various embodiments of the invention. The distance between the end of the said valve and the air inlet orifice may be constant, as shown in Fig. 1, or it may be adjustable. The adjustment is obtained by sliding both tubes in the cork; as shown in Fig. 2, or by more or less screwing a tube F which carries the said valve, as shown in Fig. 3.

Other forms of construction which are based upon the same principle may be employed without departing from the principle of the invention.

What I claim is:—

1. In a pouring device for liquids controlling the depth of the discharged liquid, a pair of tubes cooperable with a reservoir of the liquid to be discharged, one being a discharge tube adapted to communicate with the bottom of the reservoir when the latter is in discharging position, the other being an air tube communicating with the air space in said reservoir above the level of the liquid when the reservoir is in discharging position and open to the atmosphere at its other end, an inwardly opening check valve in the outer end of the discharge tube, adapted to be opened by contact of said valve with the bottom of a vessel, the atmospheric end of said air tube terminating short of the outer end of said valve when the latter is in open position, a distance determining the depth of the discharged liquid in said vessel, said air tube being sealed by the discharged liquid at this depth, automatically inhibiting further discharge from said reservoir.

2. In a pouring device for liquids controlling the depth of the discharged liquid, a pair of tubes cooperable with a reservoir of the liquid to be discharged, one being a discharge tube adapted to communicate with the bottom of the reservoir when the latter is in discharging position, the other being a permanently open air tube communicating with the air space in said reservoir above the level of air space in said reservoir above the level of the liquid when the reservoir is in discharging position and open to the atmosphere at its other end, an inwardly opening check valve in the outer end of the discharge tube, adapted to be opened by contact of said valve with the bottom of a vessel, the atmospheric end of said air tube terminating short of the outer end of said valve when the latter is in open position, a distance determining the depth of the discharged liquid in said vessel, said air tube being sealed by the discharged liquid at this depth, automatically inhibiting further discharge from said reservoir.

3. In a pouring device for liquids controlling the depth of the discharged liquid, a pair of tubes cooperable with a reservoir of the liquid to be discharged, one being a discharge tube adapted to communicate with the bottom of the reservoir when the latter is in discharging position, the other being an air tube communicating with the air space in said reservoir above the level of the liquid when the reservoir is in discharging position and open to the atmosphere at its other end, an inwardly opening check valve in the outer end of the discharge tube, adapted to be opened by contact of said valve with the bottom of a vessel, the atmospheric end of said air tube terminating short of the outer end of said valve when the latter is in open position a distance determining the depth of the discharged liquid in said vessel, said air tube being sealed by the discharged liquid at this depth, automatically inhibiting further discharge from said reservoir, and a bushing retaining said valve and adjustable lengthwise in the outer end of said discharge tube for varying the length thereof, and thereby regulating the depth of the discharged liquid in said vessel.

4. In a pouring device for liquids controlling the depth of the discharged liquid, a pair of tubes cooperable with a reservoir of the liquid to be discharged, one being a discharge tube adapted to communicate with the bottom of the reservoir when the latter is in discharging position, the other being an air tube communicating with the air space in said reservoir above the level of the liquid when the reservoir is in discharging position and open to the atmosphere at its other end, an inwardly opening check valve in the outer end of the discharge tube adapted to be opened by contact of said valve with the bottom of a vessel, the atmospheric end of said air tube terminating short of the outer end of said valve when the latter is in open position, a distance determining the depth of the discharged liquid in said vessel, said air tube being sealed by the discharged liquid at this depth, automatically inhibiting further discharge from said reservoir, said valve being constructed to be sealed by gravity assisted by pressure of the liquid in said reservoir.

In testimony whereof I have signed my name to this specification.

JEAN LÉON MAURICE FRÉJACQUES.